March 2, 1926. 1,575,237
F. W. VODOZ
VEHICLE SIGNAL
Filed Jan. 27, 1922 3 Sheets-Sheet 2
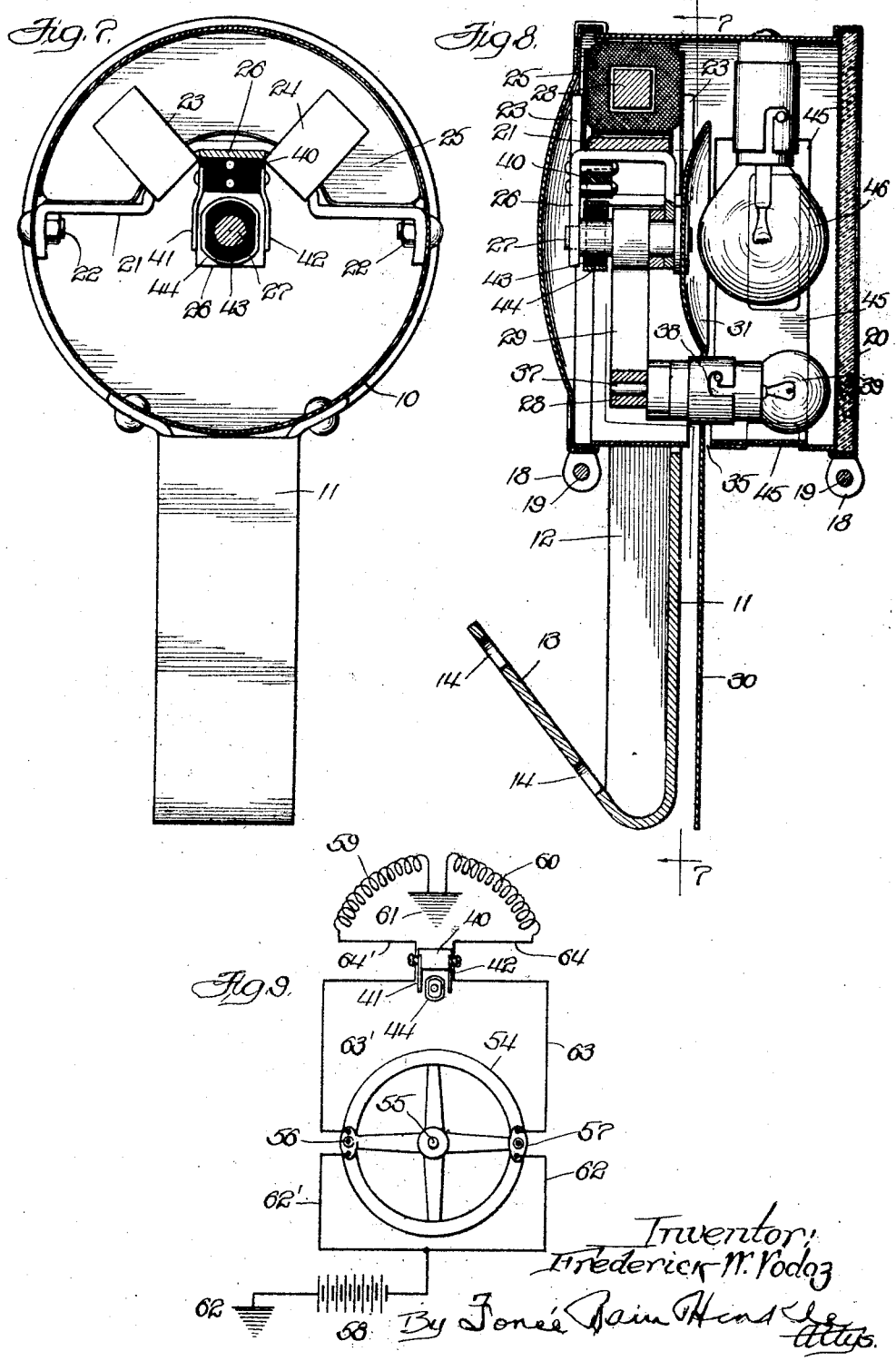

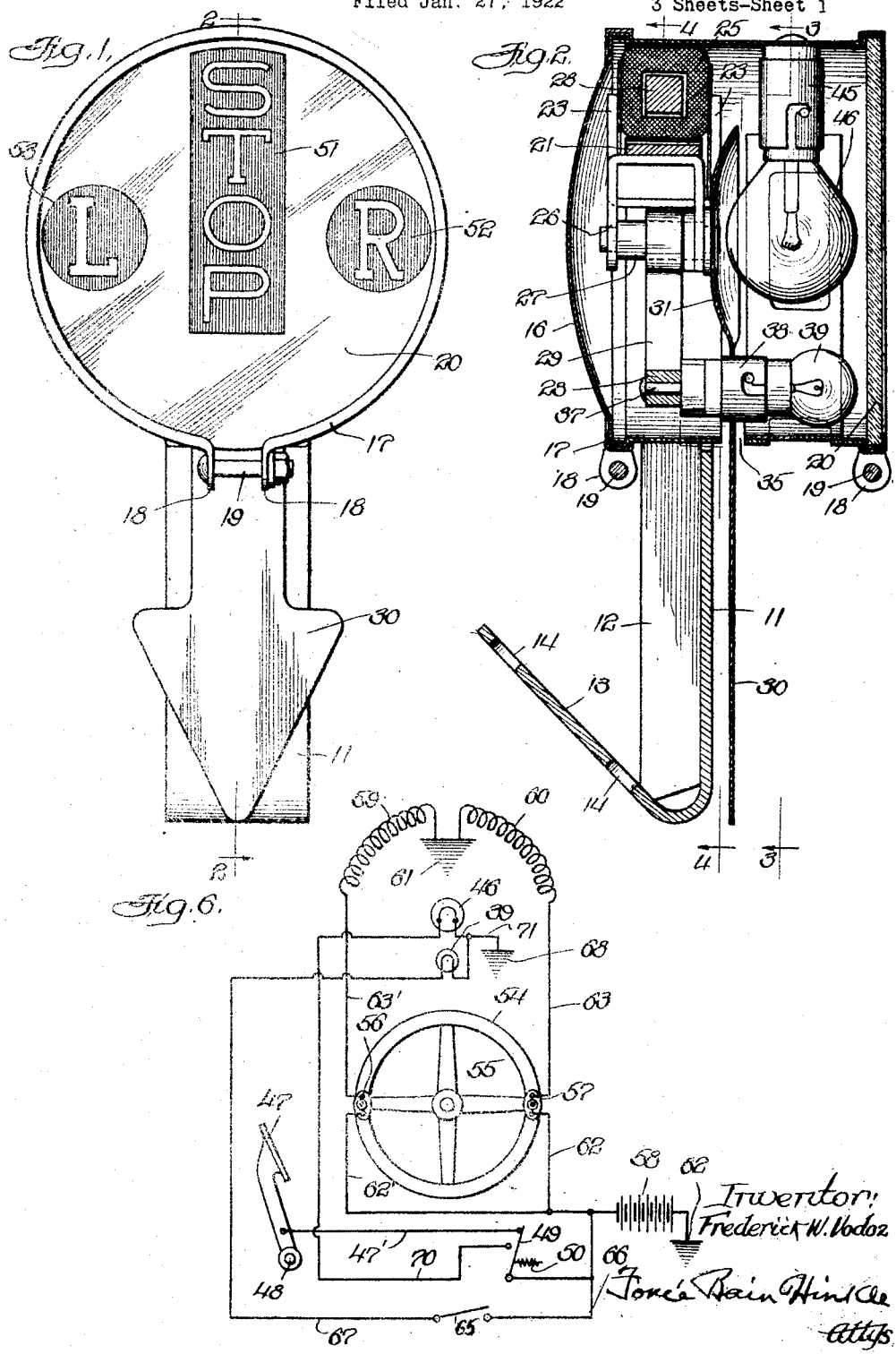

March 2, 1926.
F. W. VODOZ
VEHICLE SIGNAL
Filed Jan. 27, 1922
1,575,237
3 Sheets-Sheet 3
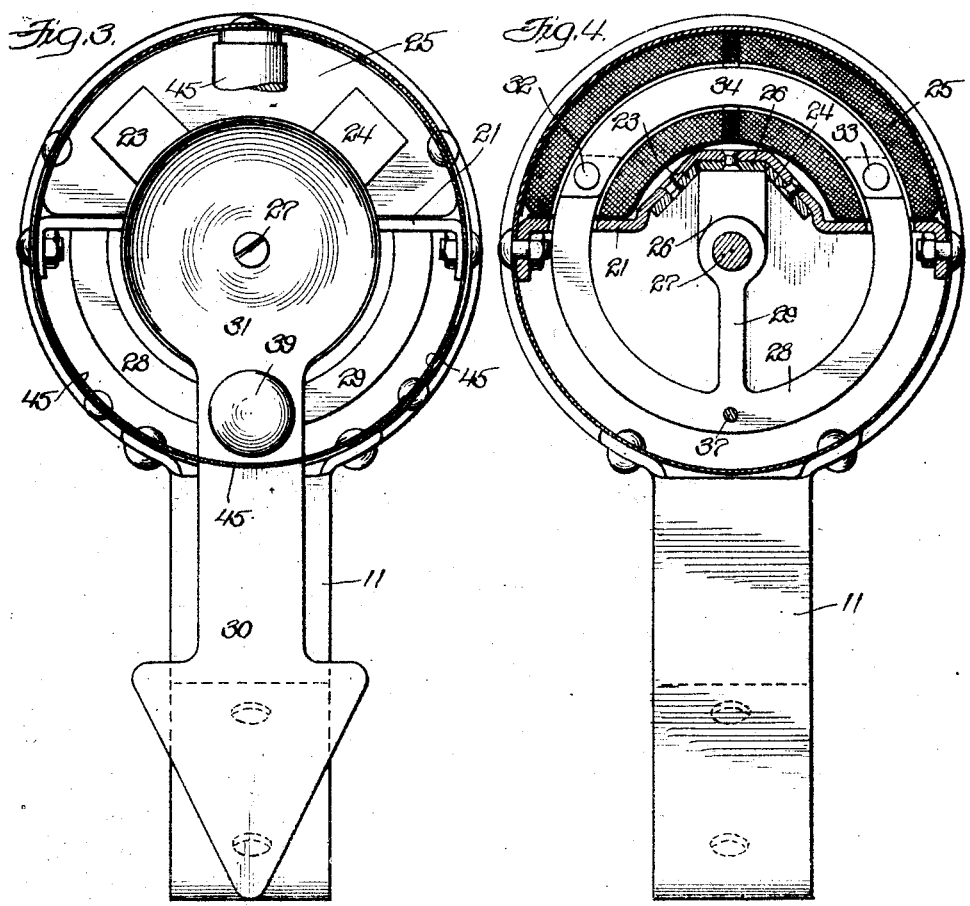
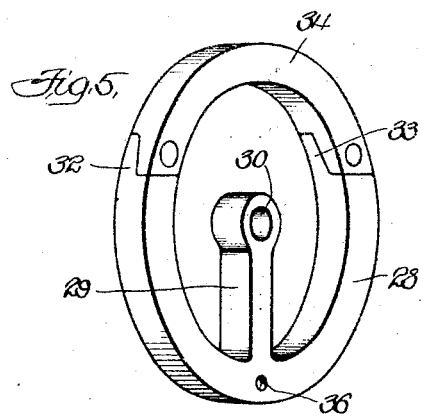
Inventor
Frederick W. Vodoz.
By Jones Bain Hinkle
Attys.

Patented Mar. 2, 1926.

1,575,237

UNITED STATES PATENT OFFICE.

FREDERICK W. VODOZ, OF CHICAGO, ILLINOIS.

VEHICLE SIGNAL.

Application filed January 27, 1922. Serial No. 532,127.

*To all whom it may concern:*

Be it known that I, FREDERICK W. VODOZ, a citizen of the United States, residing at Chicago, in the county of Cook and State of Illinois, have invented certain new and useful Improvements in Vehicle Signals, of which the following is a specification.

This invention relates to vehicle signals. One of the objects of the invention is to provide an improved rear end signal lamp for automobiles.

Another object is to provide a signal combining a tail light, stop signal and direction light, all in one casing.

Another object is to provide a signal in which the usual tail lamp is movable to signify also the direction the car is about to take.

Another object is to provide a single signal light within which to contain a constantly burning tail lamp; an intermittently burning emergency lamp, and electric means to move the tail lamp to the right or to the left by manually operated means.

Other objects and advantages of the invention will hereinafter appear from a consideration of the following description when taken in conjunction with the drawings, wherein:—

In the drawings:—

Fig. 1 is a front elevation of the device.

Fig. 2 is a section taken on line 2—2 of Fig. 1.

Fig. 3 is a section taken on line 3—3 of Fig. 2.

Fig. 4 is a section taken on line 4—4 of Fig. 2.

Fig. 5 is an isometric perspective view of the ring armature for moving the tail light.

Fig. 6 is a diagram of circuits of the preferred structure embodied in Figs. 1 to 4, inclusive.

Fig. 7 is a section taken on line 7—7 of Fig. 8.

Fig. 8 is a central section of the modification shown in Fig. 7.

Fig. 9 is a diagram of circuits of the modification.

In all the views the same reference characters are employed to indicate similar parts.

In the embodiment indicated 10 is a cylindrical casing having secured thereto a supporting handle 11 which is flanged at 12 and has an upturned attaching part 13 at an angle thereto provided with perforations 14 for attachment to a fixed part of an automobile.

The mechanism about to be described is covered by an end closure 16, the closure being held to the casing by a ring 17 having ears 18 at its extremities, held together by a screw 19. The other end of the casing is closed by a more or less opaque lens, or glass 20, held in place in the same manner by the ring 17 and the screws 19.

Mounted on the upper part of the casing 10 is an angular cross brace member 21 secured to the side of the casing by screws or rivets 22 and carrying two U-shape members 23 and 24 within which to include and to support the curved solenoid coil 25. Secured to the mid-portion of the frame 21 is a downturned U-shaped part 26 to afford bearings for an oscillatable shaft 27. Shaft 27 carries the circular armature 28 for the solenoid structure or coil 25. The armature 28 is provided with an inwardly extending or radial arm 29, having a perforation 30 thru which the shaft 27 passes and to which it is fixed. Secured to one end of the armature shaft 27 and rotatable therewith is a direction indicating arrow 30 expanded at its upper end into a concave reflector 31. When the armature 28 is rotated, in the manner hereafter to be described, the arrow 30 it rotated therewith from a normal vertical position thru 90 degrees to the left or to the right, as the case may be. The poles of the armature 28 are located at 32 and 33, respectively. The incomplete ring or circle, which is a form of the armature, is continued into a complete ring by a non-magnetic portion 34 which may be of brass, or the like, the object being to balance the armature in all of its positions by the presence of this magnetically inert member.

The casing 10 is slotted, as at 35, to permit the free movement of the arrow 30 from its normal vertical position to a position at right angles thereto on either side of the vertical axis of the device.

The armature 28 is provided with aperture 36 located at the base of the inwardly projecting arm 29 in which is secured a pin or screw 37 for supporting a socket 38 for the tail lamp 39.

Secured to the supporting member 26 is a block of insulating material 40 and supported on each side thereof are spring contact brushes or blades 41 and 42. In the horizontal plane with the brushes 41 and 42 is an insulating member 43 secured to the shaft 27 and bearing a metal ring 44 substantially in the form of an ellipse, which is normally out of contact with the brushes 41 and 42 when the arrow 30 and lamp 39 are in their vertical positions. Just before the shaft 27 is rotated thru an arc of 90 degrees the ring 44 will electrically connect the brushes 41 and 42.

In the side wall of the casing 10 is provided an opening covered by a transparent plate 45, so that when the tail lamp 39 is in any of its positions the light will shine therefrom onto the license plate that may be placed in front of the arrow 30 and below the casing.

In front of the concave reflector 31 and to the upper part of the casing 10 is secured a lamp socket 45' to receive a relatively large lamp 46. This is the emergency lamp to be lighted at the time when the automobile is about to stop, as when the brakes are applied. Any convenient switch mechanism operated by the brake lever 47 as shown in the diagram in Fig. 6, will answer, in which the brake lever 47 is pivoted at 48 operating the switch 49 for normally closing the circuit thru the lamp 46, and the spring 50 opens the switch 49 when the foot lever 47 is released, thereby extinguishing the light of the lamp 46. The lamp 46 illuminates the word "Stop" shown at 51 in Fig. 1 on the light transmitting plate 20. When the tail lamp 39 is swung to the right it illuminates the letter "R" in the circle 52, and when it is swung to the opposite side it illuminates the letter "L" in the circle 53, and normally it illuminates the lower part of the plate 20 which may be of red glass, or the like. The circles 52 and 53 and the space occupied by the word "Stop" are substantially transparent with letters more or less opaque.

The steering wheel 54, supported on the shaft 55, carries push buttons 56 and 57, one on each side of the wheel and one accessible to the right hand, and the other accessible to the left hand of the driver.

A suitable source of electric current such as a battery 58 is means for illuminating the lamps 39 and 46 and for energizing the solenoid 25. The solenoid 25 is divided into two coils 59 and 60 grounded, as at 61, and the battery 58 is grounded as at 62.

To cause the armature, or core 28, of the solenoid to move 90 degrees from its normal position of rest and to move selectively either to the right or to the left, depending upon the time of closing the circuit in the respective coils, I have shown arrangement of circuit in Fig. 9 in which this operation is accomplished.

If it is desired, for example, to move the armature or core to the right, so that the tail lamp 39 will appear immediately under the letter "R", the button 57 is pushed to close the circuit by the operation of the right hand of the driver; this will close the circuit from the battery 58 thru the wires 62 and 63, the wire 64, thru the solenoid coil 60, ground 61, thence to the battery, causing the initial movement of the core 28 toward the right, and just about the time that the core has moved as far as the coil 60 will have effect upon it for this purpose, the circuit is closed between the brushes 41 and 42 by the contact ring 44, whereupon the circuit will now be completed from the brush 42 thru the contact ring, to the brush 41 and over the wire 64' and thru coil 59, thus the coil 59 will supplement the effect of the coil 60 upon the armature and cause a further movement thereof.

Now, if it is desirable to rotate the armature in the opposite direction, button 56 is pushed, which closes circuit over the wires 62', 63' and 64' thus rotating the armature to the left and subsequently closing the circuit thru the coil 60 by the means heretofore described. The initiative direction of movement of the armature is determined by the coil thru which circuit is primarily closed.

The circuit is closed permanently thru the tail lamp 39 by the switch 65, over the wires 66, 67 to the ground 68 and thence to the battery ground 62. When the switch 49 operated by the brake lever 47 is closed, the circuit is then completed over the wires 70 and 71 thru the lamp 46 to the ground 68. This occurs only when the brake lever 47 is operated to apply the brakes at which time the word "Stop" on the face of the instrument or the dial 20 is illuminated.

When the tail lamp 39 is rotated, by the armature 28, to its positions L and R, it not only illuminates these letters to indicate the direction that the automobile is about to take, but this is supplemented by the position of the arrow 30 which points in the respective directions indicated by the letters.

In Fig. 6 I have not shown the commutating device consisting of the brushes 41 and 42 and ring 44, for the reason that it would complicate the circuits; but this arrangement may be used for the purpose of augmenting the effect of the solenoid upon its armature 28 to produce the complete extent of its movement.

While I have herein shown an embodiment and a single modification of the device for the purpose of clear disclosure, it will be manifest that many changes may be made in the general configuration and disposition of the parts within the scope of the appended claims.

Having described my invention what I claim as new and desire to secure by Letters Patent, is:—

1. In a signal, a curved solenoid divided into two registering sections; a curved rotatable core having its ends terminating near the outer end of the respective section; selective means to primarily energize either section to rotate the core in alternate directions; means operated by movement of the core to subsequently energize the other section to increase the extent of movement of said core and a signal device rotated by the core.

2. In a signal, a curved solenoid divided into two registering sections; a curved rotatable core having its ends terminating near the outer end of the respective section; selective means to primarily energize either section to rotate the core in respective directions; means operated by movement of the core to subsequently energize the other section by including it in parallel circuit with the first section energized whereby to continue and to increase the extent of movement of said core and a signal device rotated by the core.

3. In a signal, a pair of solenoids, means for selectively energizing either solenoid, a semi-circular core movable in either direction according to the selective energization of one of the solenoids, a signal arm and lamp carried by the core and actuated in opposite directions according to the solenoid selected, and means adapted to connect the inactive solenoid in parallel with the selected solenoid after a predetermined initial movement of the core to cause a further movement of said core.

In testimony whereof I hereunto subscribe my name.

FREDERICK W. VODOZ.